J. R. Pond,
Milk Cooler.
No. 95,722. Patented Oct. 12. 1869.

Witnesses:
Wm W Niles.
Abm. L. Smith

Inventor:
Julius R Pond

United States Patent Office.

JULIUS R. POND, OF NEW HARTFORD, CONNECTICUT.

Letters Patent No. 95,722, dated October 12, 1869.

IMPROVEMENT IN MILK-COOLERS.

The Schedule referred to in these Letters Patent and making part of the same.

*To all whom it may concern:*

Be it known that I, JULIUS R. POND, of New Hartford, in the State of Connecticut, have invented a new and useful Method and Apparatus for Cooling Condensed and New Milk and other fluids, and making ices, &c., and removing the same from the surface of the coolers.

It is necessary that condensed milk should be quickly cooled before it is packed for transportation, and it is also desirable that new milk should be cooled quickly, in order to keep it from chemical and mechanical changes, especially when it is to be transported, as for use in cities, &c. The methods heretofore employed for that purpose have been very expensive, and, as applicable to milk, subject to the objection that they filled it with air, and subjected it to too great and too long-continued agitation.

In freezing ices, &c., it has been difficult, if not impossible, to fix volatile flavors, &c., in consequence of the too great agitation, and the too long time employed in the process of freezing; and they have been frozen in a solid mass, instead of crystals or snowflakes.

To obviate these objections, and to secure these ends, is the object of my said invention; and I do hereby declare that the following is a full, clear, and exact description thereof, reference being had to the accompanying drawings, making part of these specifications, and to the letters of reference marked thereon, in which—

Figure 1:
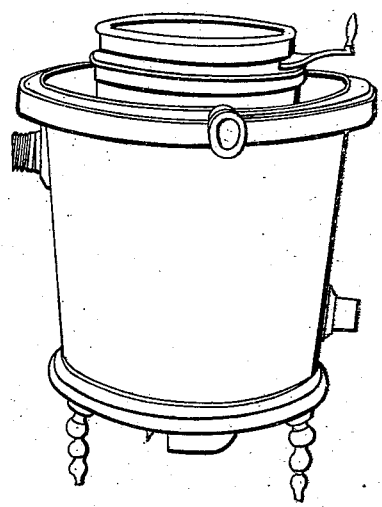
Figure 2:
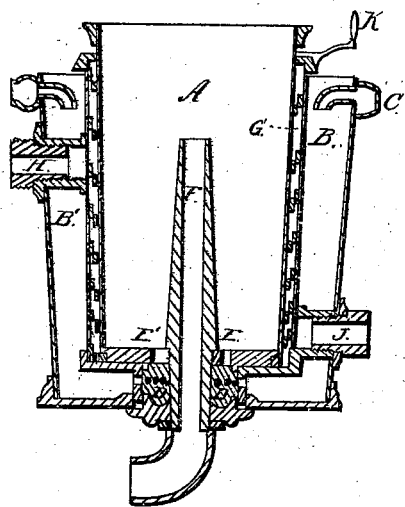
Figure 4:
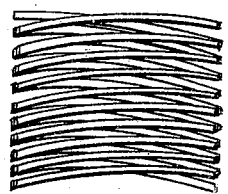
Figure 3:
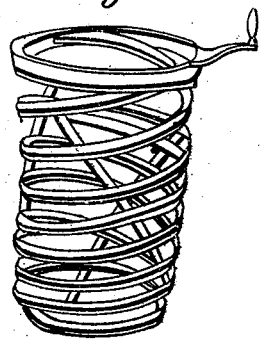

Figure 1 is the apparatus set up for use;
Figure 2 is a vertical section;
Figure 3 is the spiral; and
Figure 4 is a vertical section of another form of the spiral.

In fig. 2—

A is the wall of the inner chamber or holder.
B and B', the walls of the outer holder.
C is a pipe for the admission of cold water into the reservoir or holder.
D and D' are openings through the inner wall of the outer reservoir.
E and E' are apertures through the wall of the inner reservoir.
F, a pipe for the escape of the cold fluid from the inner reservoir.
G and G', the opening or space between the reservoirs A and B, through which the milk or other liquid to be cooled or frozen flows.
H, the pipe through which it is admitted.
I, a revolving coil or spiral in the opening G G', between the inner and outer reservoirs, used for hastening or retarding the passage of the liquid to be cooled, and for removing it from the surface of the reservoirs.

J is a pipe for the escape of the liquid to be cooled or changed into ice or snow.
K is a crank for turning the spiral. It may, however, be turned by any other known means.
Fig. 3 is the spiral.
Fig. 4 is a vertical section of the spiral formed in a different way.

The mode of operation of my said invention, which has been successfully tried, is as follows:

The reservoirs A and B are filled with salt and ice, or other refrigerating-substance or compound; or cold water, or other cold fluid, is allowed to enter at the pipe C, pass through the outer reservoir, to and through the openings D and D', E and E', into the inner reservoir, and thence out through the pipe F. The fluid to be cooled or frozen is then allowed to flow, through the pipe H, into the space G and G', between the two reservoirs A and B. By revolving the crank K, the spiral I is made to pass around the reservoir A, and rubbing against the outer surface of A, and the inner surface B, removes the liquid, cooled or congealed, from those surfaces, and presses it on to and through the pipe J, when it is ready for use.

In case the temperature of the fluid to be acted upon is not sufficiently reduced before it passes out at the pipe J, its motion may be retarded by slowing or reversing the motion of the spiral; or, by making the spiral as shown in fig. 4, its passage is retarded by the thinner bend of the spiral, and pressed forward by the thicker outer bend; and it receives a rolling motion as it flows on.

By this means, the temperature of any fluid may be readily and quickly reduced without being filled with air, or churned; or, if desired, it may be quickly congealed to ice or snow.

What I claim as new, and desire to secure by Letters Patent, is—

The construction and arrangement of the within-described milk-cooler, consisting of the inner and outer reservoirs A and B, inlet-pipe, for water, C, openings D and E, overflow-pipe F, central reservoir G, inlet and outlet-pipes H and I, and spirals, figs. 3 and 4, substantially as and for the purpose shown.

Also, the combination of a movable spiral with one or more reservoirs or coolers, substantially as shown, and for the purpose specified.

Also, the combination and arrangement of the pipes C and F and openings D and E with the reservoirs A, B, and G, substantially as shown and described.

JULIUS R. POND.

Witnesses:
WM. W. NILES,
ABM. L. SMITH.